United States Patent
Schandel et al.

(10) Patent No.: US 12,303,852 B2
(45) Date of Patent: May 20, 2025

(54) FOOD PROCESSOR WITH CLEANING ACCESSORY AND METHODS OF USING SAME

(71) Applicant: Hamilton Beach Brands, Inc., Glen Allen, VA (US)

(72) Inventors: David Matthew Schandel, Mechanicsville, VA (US); Koen Aidan Ambrose, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 810 days.

(21) Appl. No.: 17/509,409

(22) Filed: Oct. 25, 2021

(65) Prior Publication Data

US 2022/0040652 A1 Feb. 10, 2022

Related U.S. Application Data

(63) Continuation-in-part of application No. 16/746,504, filed on Jan. 17, 2020, now Pat. No. 12,042,773.

(51) Int. Cl.
*B01F 35/12* (2022.01)
*A47J 43/07* (2006.01)
*B01F 35/10* (2022.01)
*B01F 101/06* (2022.01)

(52) U.S. Cl.
CPC ........... *B01F 35/12* (2022.01); *A47J 43/0722* (2013.01); *B01F 35/1452* (2022.01); *B01F 2101/06* (2022.01)

(58) Field of Classification Search
CPC ...... B01F 35/12; B01F 35/121; B01F 35/122; B01F 35/123; B01F 35/10; B01F 35/1452
See application file for complete search history.

(56) References Cited

U.S. PATENT DOCUMENTS

| | | | | |
|---|---|---|---|---|
| 5,383,613 A | * | 1/1995 | Sundquist | A47J 43/0705 241/37.5 |
| 2011/0011281 A1 | * | 1/2011 | Allen | A47J 43/0716 241/37.5 |
| 2012/0294108 A1 | * | 11/2012 | Dickson, Jr. | B01F 27/808 366/205 |
| 2014/0241109 A1 | * | 8/2014 | Paget | A47J 43/046 366/205 |
| 2016/0045073 A1 | * | 2/2016 | Kozlowski | A47J 43/046 366/182.1 |
| 2017/0368519 A1 | * | 12/2017 | Thies | B01F 35/121 |
| 2018/0055060 A1 | * | 3/2018 | Deng | A21C 1/1485 |
| 2019/0374915 A1 | * | 12/2019 | Charopoulos | B01F 35/121 |
| 2022/0111341 A1 | * | 4/2022 | Ren | B01F 31/441 |

FOREIGN PATENT DOCUMENTS

WO WO-2007085671 A1 * 8/2007 ........ B01F 15/00051

* cited by examiner

*Primary Examiner* — Marc C Howell
(74) *Attorney, Agent, or Firm* — Alexander D. Raring

(57) ABSTRACT

A method of cleaning a food processor includes:
(a) providing a food processor a base that includes a rotary power driver having a rotatable shaft; a bowl mounted on the base; and a food processing blade attached to the shaft within the bowl;
(b) inserting a cleaning accessory into the bowl above the food processing blade;
(c) introducing cleaning fluid into the bowl; and
(d) rotating the food processing blade with the rotatable shaft to agitate the cleaning fluid.

19 Claims, 20 Drawing Sheets

FOOD PROCESSOR WITH CLEANING ACCESSORY AND METHODS OF USING SAME

The present application claims priority from and the benefit of co-assigned and co-pending U.S. patent application Ser. No. 16/746,504, filed Jan. 17, 2020, the disclosure of which is hereby incorporated herein in its entirety.

FIELD OF THE INVENTION

Field of the Invention

The present invention is directed to processing foodstuffs and, more particularly, to a food processor with at least partial self-cleaning capability.

Background

Food processors or other such appliances have become popular and are commonly used in residential and/or commercial kitchens or other locations where foodstuff is prepared. A typical food processor includes a container (usually in the form of a bowl), a lid with a food chute extending generally perpendicularly from the top surface of the lid, a food pusher that can extend within the food chute to force food into the container, and a rotary blade (usually an "S-blade" unit, which has two arced blades extending radially in opposite directions from a central hub). Ordinarily the container is mounted onto a motor base, and one or more buttons in the motor base allow a user to actuate the electric motor to rotate the blade. Most food processors also include one or processing discs that may be employed for specific food processing operations, such as slicing, grating, dicing or the like.

As the popularity of food processors has grown, consumers are using the devices to process a wider variety of foods. Some of these foods (for example, cheese, peanut butter, "smoothie" beverages and the like) have viscous and/or sticky textures that make them difficult to clean from the components of the food processor, particularly from the S-blade and other food processing discs. As such, it may be desirable to provide a technique for enhancing the cleaning process of a food processor.

SUMMARY

As a first aspect, embodiments of the invention are directed to a self-cleanable food processor. The food processor comprises: a base that includes a rotary power driver having a rotatable shaft; a bowl mounted on the base; a food processing blade attached to the shaft within the bowl; and a cleaning accessory mountable on the bowl for sliding contact relative thereto and above the cutting blade. Operation of the food processing blade with the cleaning accessory in place can agitate a cleaning liquid in the bowl that in turn cleans surfaces of the bowl and food processing blade.

As a second aspect, embodiments of the invention are directed to a self-cleanable food processor, comprising: a base that includes a rotary power driver having a rotatable shaft; a bowl mounted on the base; a food processing blade attached to the shaft within the bowl; and a cleaning accessory positioned above the food processing disk and mounted to rotate independently of the shaft.

As a third aspect, embodiments of the invention are directed to a self-cleanable food processor, comprising: a base that includes a rotary power driver having a rotatable shaft; a bowl mounted on the base; a food processing blade attached to the shaft within the bowl; and a cleaning accessory positioned in the bowl above the food processing disk, the cleaning accessory having a central hole, the rotatable shaft extending through the central hole but not engaging the cleaning accessory.

As a fourth aspect, embodiments of the invention are directed to a self-cleanable food processor, comprising: a base that includes a rotary power driver having a rotatable shaft; a bowl that is mounted on the base; a food processing blade attached to the shaft; a cleaning accessory mounted above the cutting blade; and a food processing disk positioned above the cleaning accessory and mounted to the shaft for rotation therewith.

As a fifth aspect, embodiments of the invention are directed to a cleaning accessory for a food processor, comprising: a main panel with upper and lower surfaces; a rim attached to and extending radially from the main panel; a ring depending downwardly from the rim; and a plurality of protrusions mounted on and extending downwardly from the lower surface of the main panel. At least some of the protrusions are radially-extending rays. The cleaning accessory further comprises a plurality of holes in the main panel.

As a sixth aspect, embodiments of the invention are directed to a Method of cleaning a food processor, comprising:

(a) providing a food processor a base that includes a rotary power driver having a rotatable shaft; a bowl mounted on the base; and a food processing blade attached to the shaft within the bowl;

(b) inserting a cleaning accessory into the bowl above the food processing blade;

(c) introducing cleaning fluid into the bowl; and (d) rotating the cutting blade with the rotatable shaft to agitate the cleaning fluid.

As a seventh aspect, embodiments of the invention are directed to a cleaning accessory for a food processor comprising: a central hub having a central hole; a plurality of upper panels extending radially outwardly from the central hub; a plurality of lower panels being positioned to circumferentially alternate with the plurality of upper panels; a plurality of dividing walls, each of the dividing walls extending between an upper panel and an adjacent lower panel; and an outer rim encircling the plurality of upper panels.

As an eighth aspect, embodiments of the invention are directed to a cleaning accessory for a food processor comprising: a central hub having a central hole; a plurality of upper panels extending radially outwardly from the central hub; a plurality of lower panels being positioned to circumferentially alternate with the plurality of upper panels; a plurality of dividing walls, each of the dividing walls extending between an upper panel and an adjacent lower panel; an outer rim encircling the plurality of upper panels; and a plurality of vertical walls, wherein a respective one of the vertical walls extends between an outer edge of each lower panel and the rim. A plurality of inner openings are present, wherein each inner opening is defined by two dividing walls, the central hub, and one of the plurality of lower panels.

As a ninth aspect, embodiments of the invention are directed to a cleaning accessory for a food processor comprising: a central hub having a central hole; at least one upper panel extending radially outwardly from the central hub; and an outer rim encircling the at least one upper panel. The at least one upper panel includes a soap recess.

BRIEF DESCRIPTION OF THE FIGURES

FIG. 13A is a partial front section view of one of the holes and nozzles of the cleaning accessory of FIG. 13.

DETAILED DESCRIPTION

Figure 1:
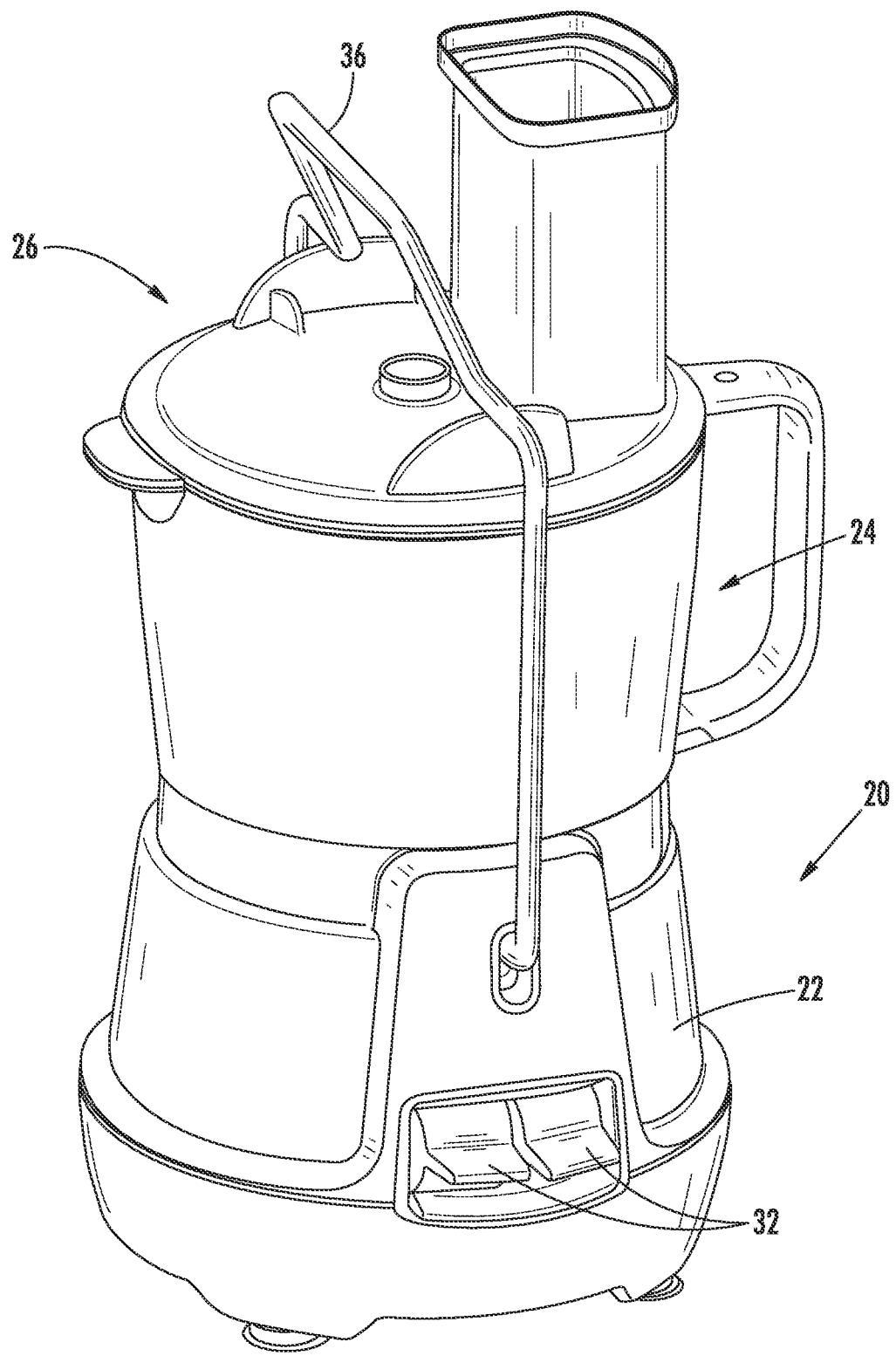
FIG. 1 is a perspective view of a food processor with a cleaning accessory according to embodiments of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Referring now to the figures, a food processor, designated broadly at 20, is shown in FIG. 1. The food processor 20 includes a base 22, a bowl 24, a lid 26, and a drive train attached to a motor (not shown) that drives the various blades and accessories that can be used with the food processor 20. These components are described in greater detail below.

The base 22 provides a foundation for the food processor 20. The motor is housed within the base 22 and can be controlled by switches 32 or other actuation devices. A bale lock 36 is pivotally attached to side walls of the base 22 and can pivot to a vertical position in which it maintains the lid 26 in place during operation (although other varieties of locking mechanisms may also be employed).

Figure 8:
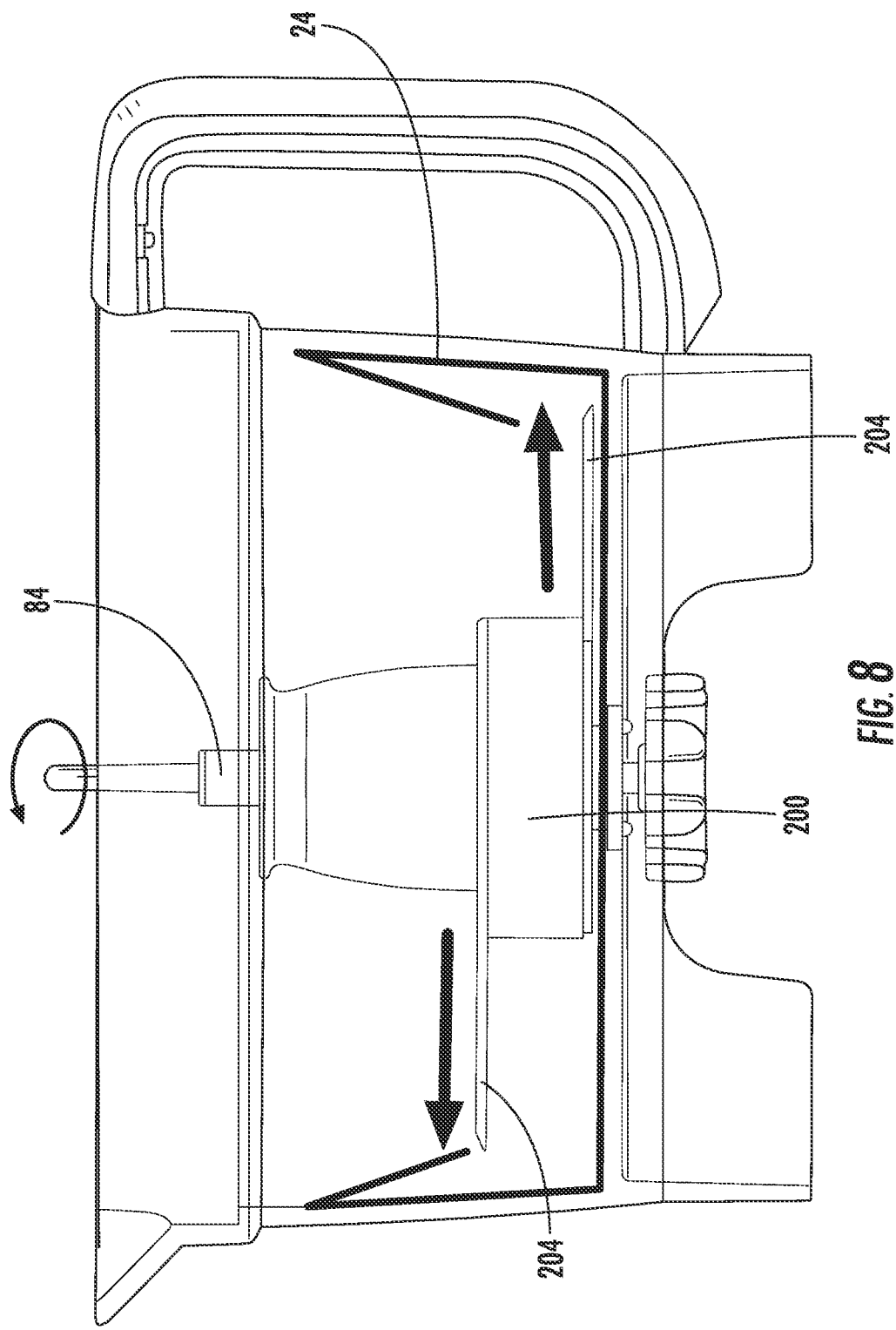
FIG. 8 is a front section view of the bowl and S-blade of the food processor of FIG. 1 showing the movement of liquid in response to rotation of the S-blade.

A drive shaft 84 (see FIG. 8) extends upwardly from the base 22 and is connected with the motor. The drive shaft 84 may include a number of couplings that fit with different blades. The structure and function of the drive shaft 84, the motor, other drive components, and alternative rotary power drivers are discussed in detail in co-assigned U.S. patent application Ser. No. 16/275,089, filed Feb. 13, 2019, the disclosure of which is hereby incorporated herein in its entirety.

Figure 2:
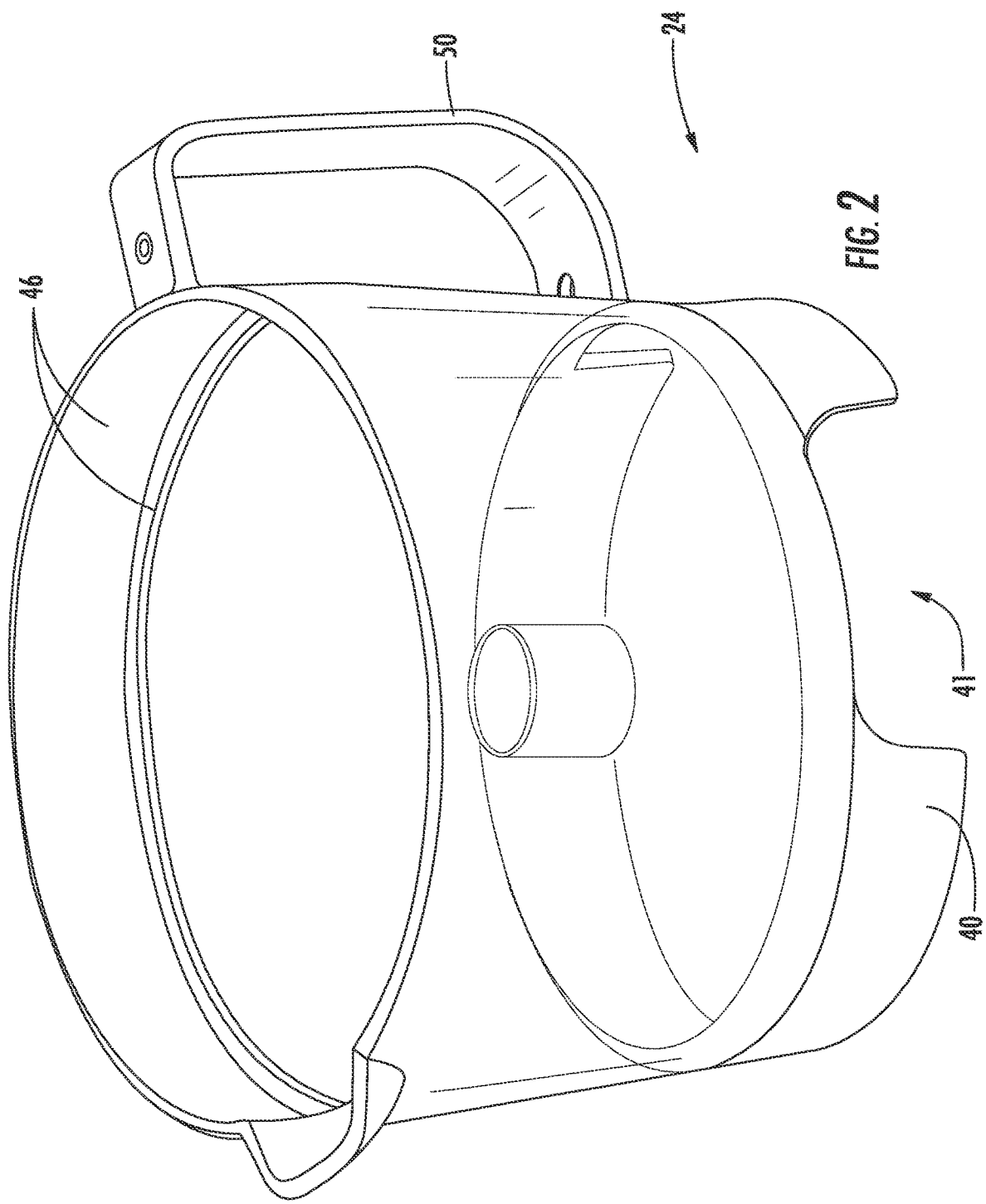
FIG. 2 is a perspective view of the bowl of the food processor of FIG. 1.
Figure 3:
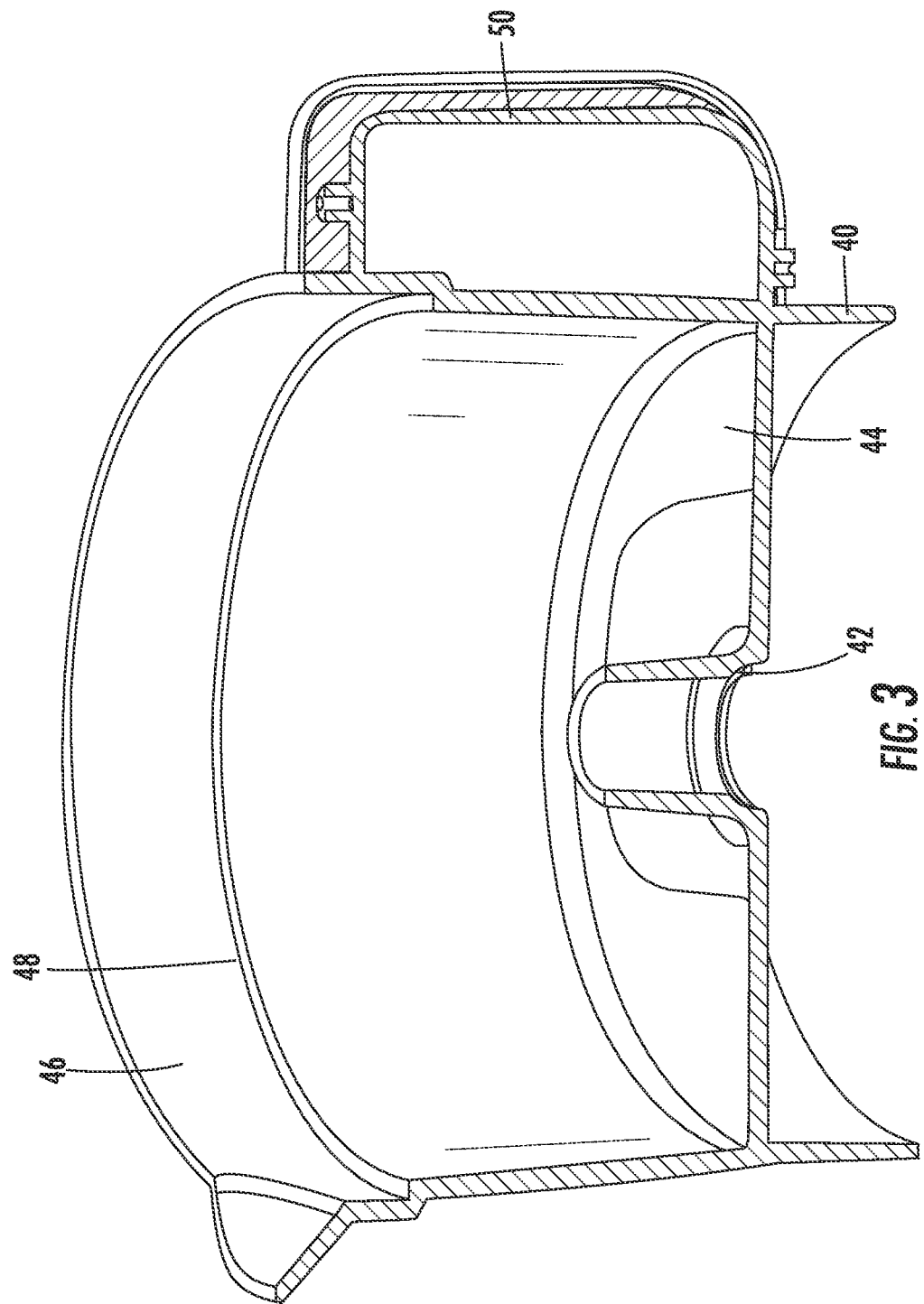
FIG. 3 is a front section view of the bowl of FIG. 2.

Referring now to FIGS. 2 and 3, the bowl 24 is generally cylindrical and rests atop the base 22. The bowl 24 includes a lower skirt 40 that overlies the upper outer edge of the base 22. The skirt 40, which includes recesses 41, may be sized to snugly fit on the base 22, and/or may include snaps, latches, or the like to enhance the stability of the fit. A boss 42 extends upwardly from the lower surface 44 of the bowl 24. At its upper end, the bowl 24 has a radially-expanded lip 46 with an inwardly-extending ridge 48. Also, a handle 50 extends radially outwardly from one side of the bowl 24.

Figure 5:
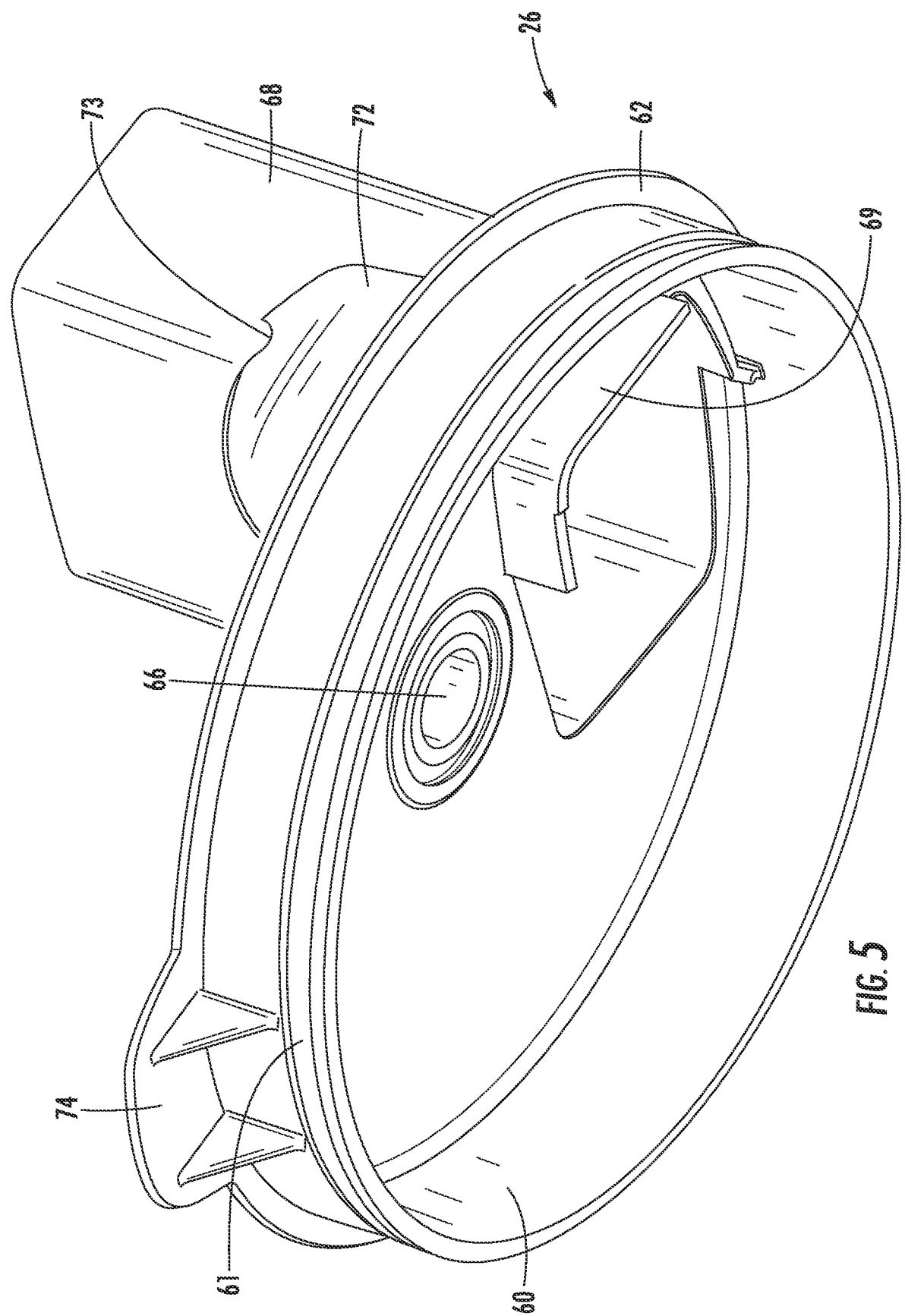
FIG. 5 is a perspective view of the lid of the food processor of FIG. 1.
Figure 6:
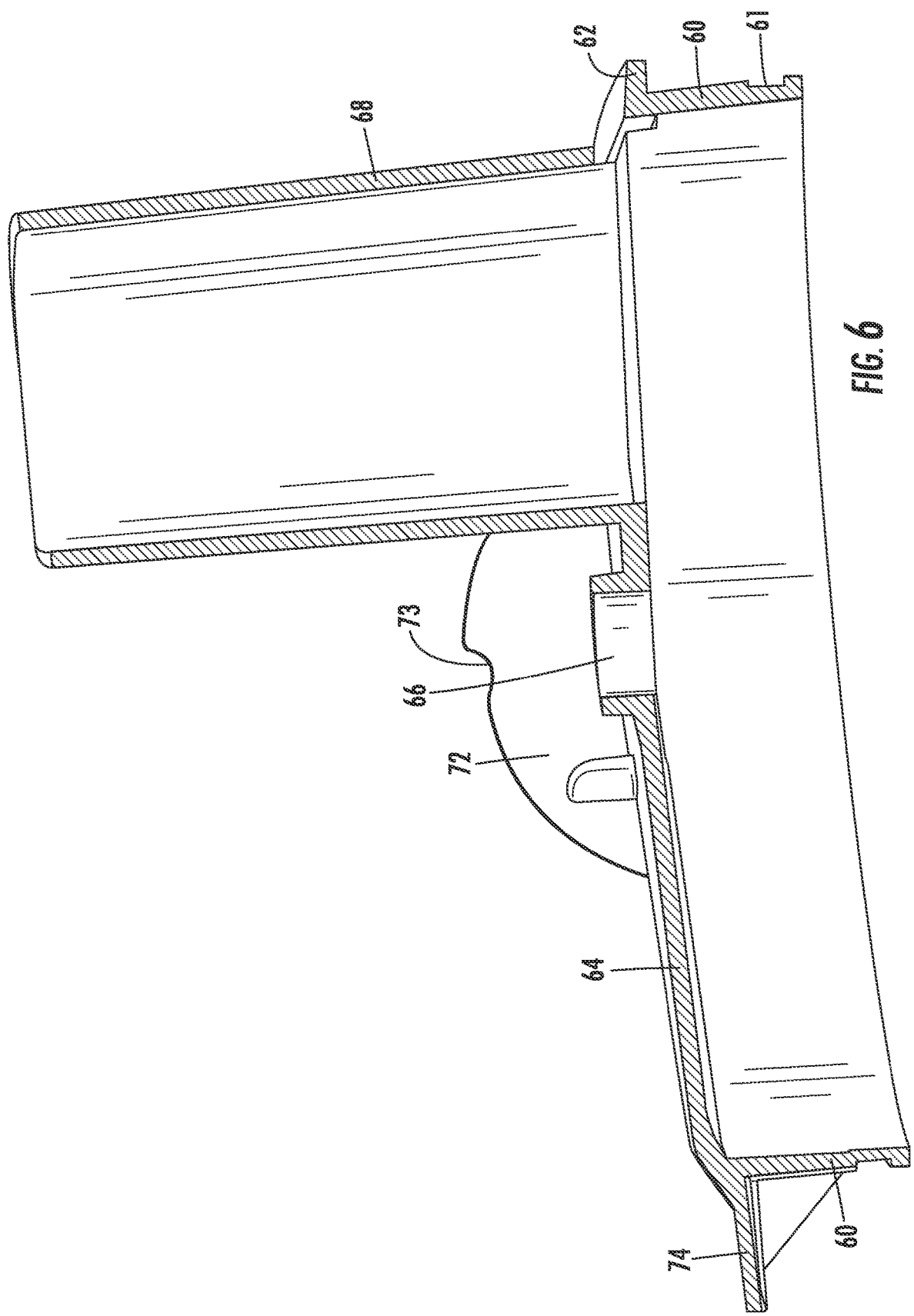
FIG. 6 is a section view of the lid of FIG. 5.

Referring now to FIGS. 5 and 6, the lid 26 has a lower rim 60 with a recess 61. The rim 60 rests on the ridge 48 of the lip 46 of the bowl 24 to maintain the lid 26 in place on the bowl 24, with the rim 60 radially inward of the lip 46. A shoulder 62 extends outwardly from the upper edge of the rim 60. The lid 26 also has a generally horizontal upper surface 64. A locater boss 66 extends downwardly from the center of the upper surface 64. A hollow food chute 68 extends upwardly from the upper surface 64; the food chute 68 is located off-center and spans much of the distance between the center of the upper surface 64 and the shoulder 62. The lower end 69 of the food chute 68 extends below the upper surface 64. Two locking projections 72 with recesses 73 extend upwardly from the upper surface 64 to provide locking locations for the bale lock 36. A tab 74 extends radially outwardly from the shoulder 62 opposite the food chute 68 to facilitate attachments and removal of the lid 26 from the bowl 24.

Figure 4:
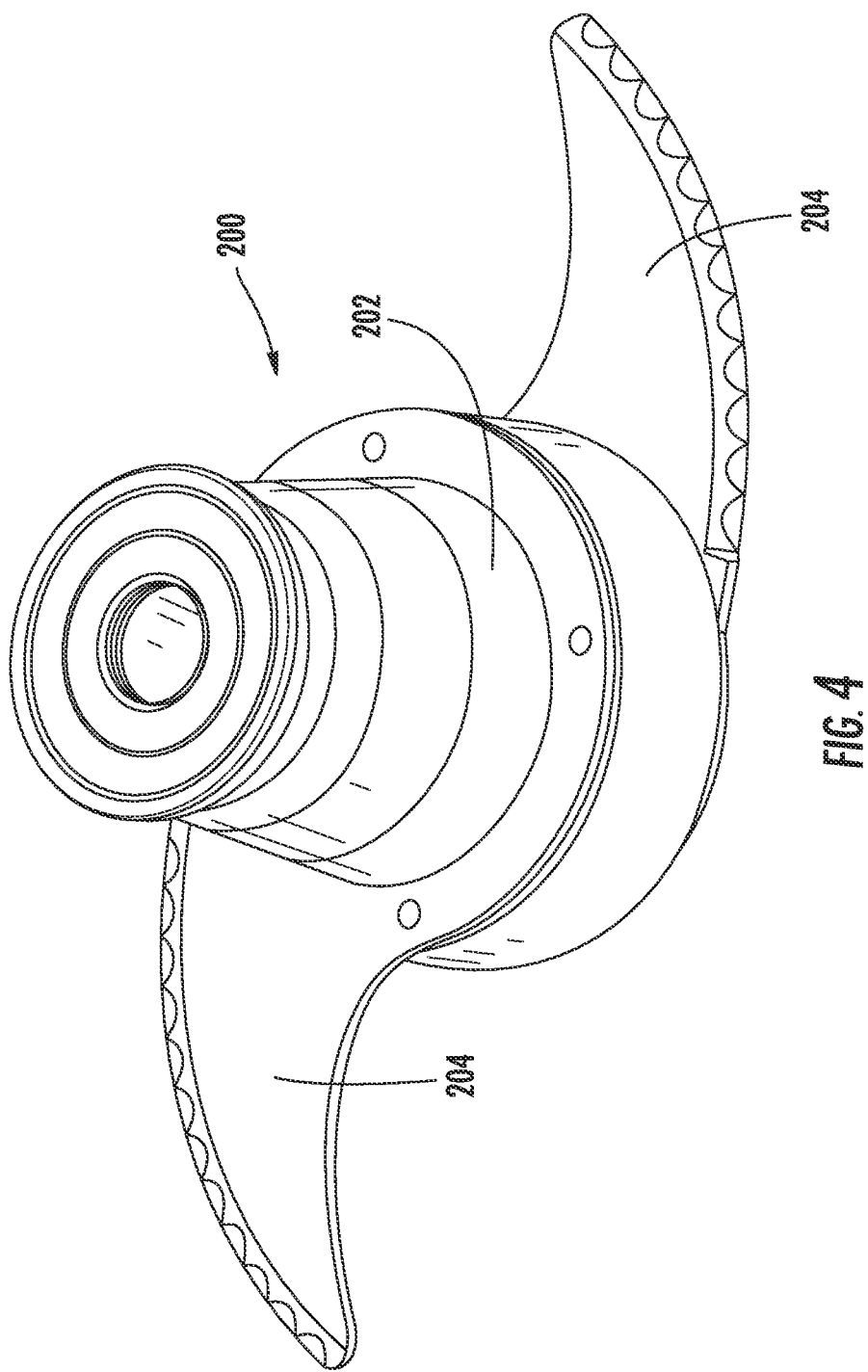
FIG. 4 is a perspective view of the S-blade of the food processor of FIG. 1.

The food processor 20 can utilize multiple blades and accessories. For example, an "S-blade" 200 with a hollow hub 202 and two blades 204 (FIG. 4) can fit over the drive shaft 84, with an inner "hex" surface of the hub 202 mating with a coupling on the drive shaft 84. Rotation of the motor drives the drive shaft 84 and, in turn, the S-blade 200. Foodstuffs are introduced into the bowl 24 (either directly, before the lid 26 is attached, or through the food chute 68 via a pusher or other implement) and can be processed as the S-blade 200 rotates. Typically, the S-blade 200 is employed for chopping, pureeing, masticating, and the like. In other embodiments, a "dough blade" may be employed in a similar manner to the S-blade 200. Other food processing blades that attach to the drive shaft 84 near the floor of the bowl 84 may also be employed.

Figure 9:
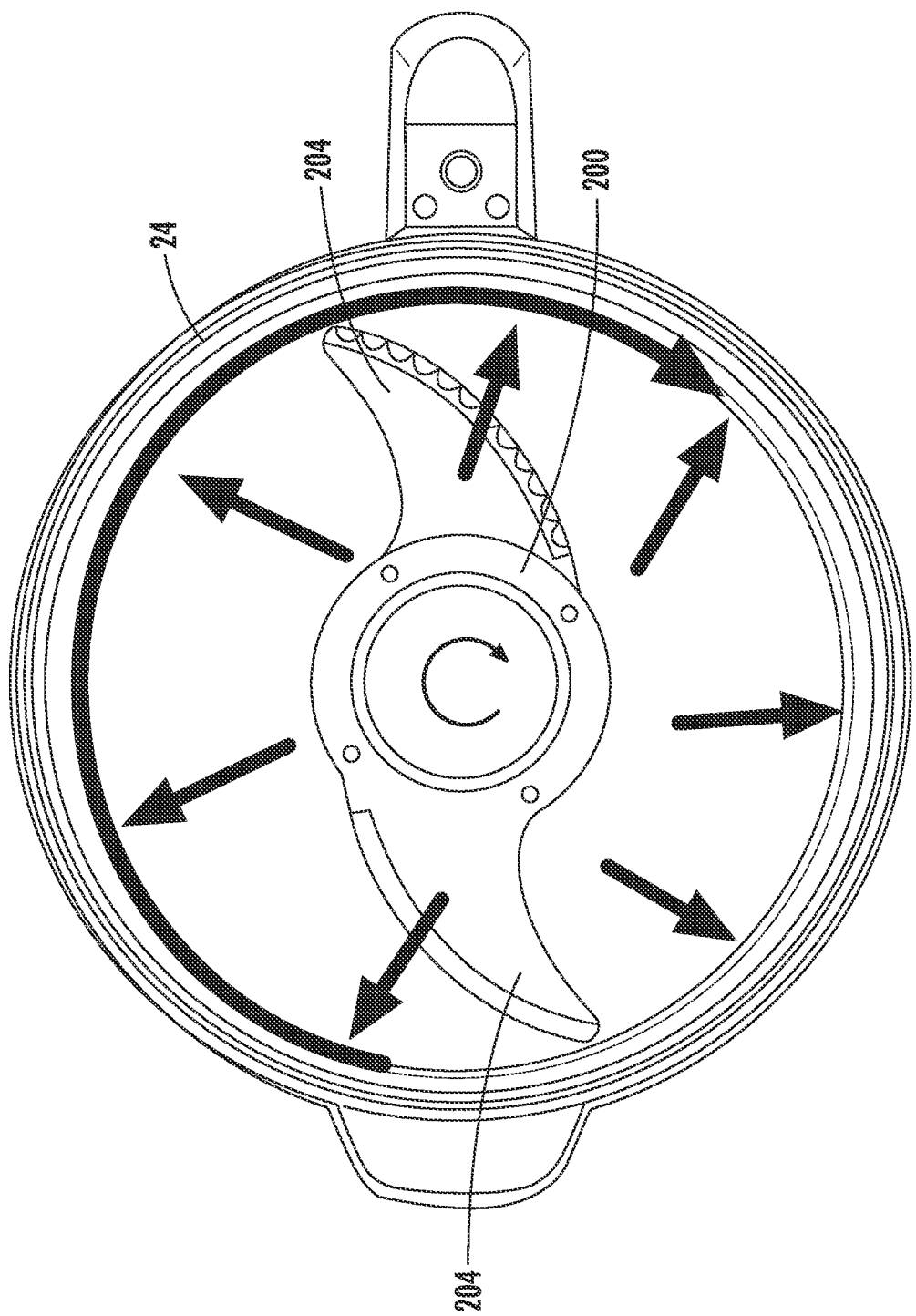
FIG. 9 is a top view of the bowl and S-blade of FIG. 8.

As discussed in a general manner above, with certain foodstuffs cleaning the food processor 20 can be difficult. The difficulty can be explained as follows. When a food processor 20 operates while containing liquid, the spinning S-blade 200 pushes the liquid to the sides of the wall of the bowl 24 and creates a vortex (represented by the heavy lines and arrows in FIGS. 8 and 9). The faster the S-blade 200 spins, the more stable the vortex. The vortex created around the bowl wall at that point is fairly laminar, with turbulence only at the tips of the blades 204 and irregularities in the geometry of the bowl and that created by the friction of the water against the bowl wall.

As a result, the liquid does not remain on the S-blade 200 for any extended period of time and certainly not long enough to help clean it. This means that any food, oils, and other residues that cannot be removed by the centrifugal forces of the spinning S-blade 200 remain on the blades 204 for secondary clean-up. This can create issues, as the S-blade 200 has to be removed and handled by the user to be scrubbed or cleaned. An improved system may enable the user to have minimal contact with the S-blade 200 beyond holding the hub 202 (i.e., little to no user contact with the blades 204).

Figure 10:
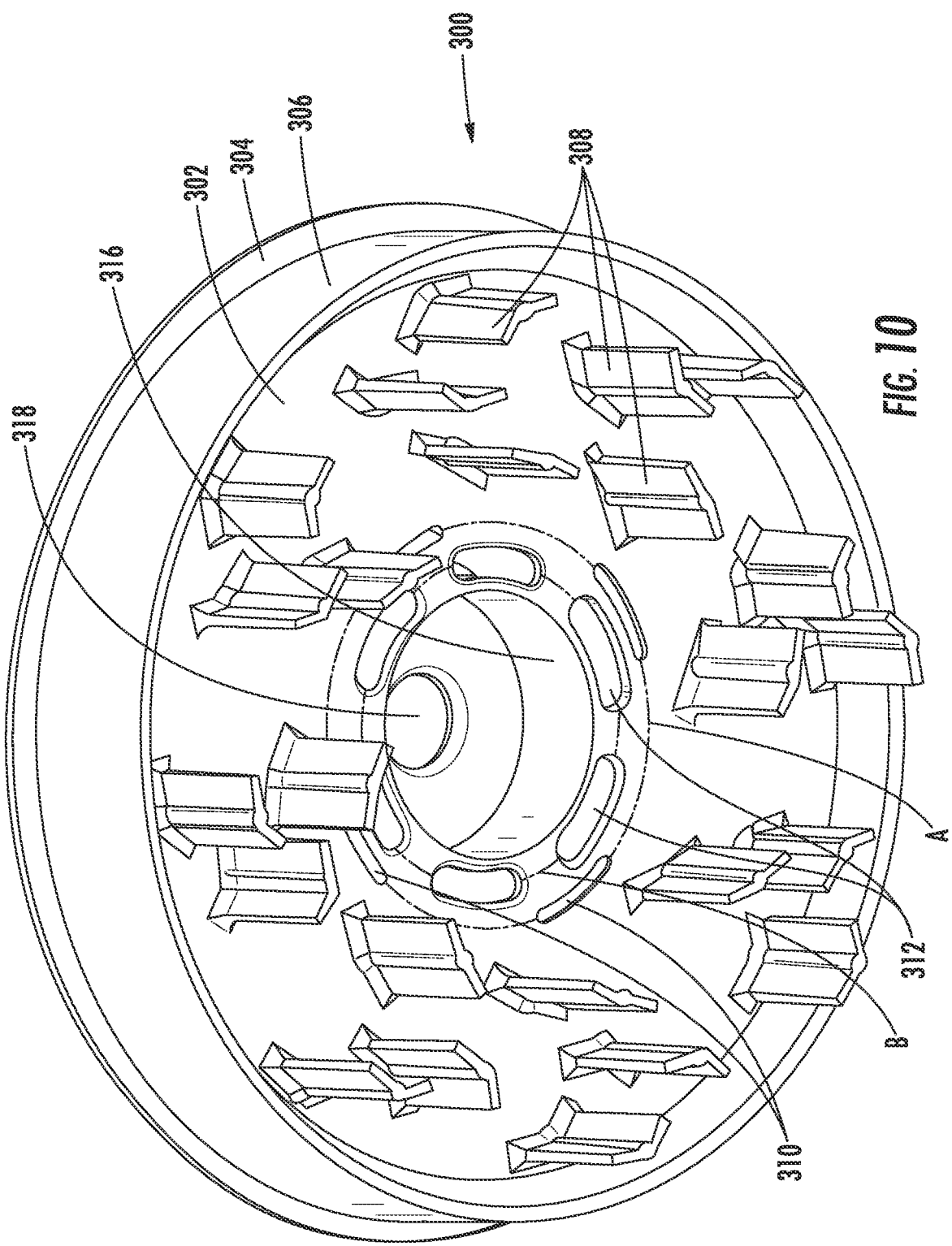
FIG. 10 is a bottom perspective view of a cleaning accessory for use with the food processor of FIG. 1 in accordance with embodiments of the invention.

Referring now to FIG. 10, an exemplary cleaning accessory that can be employed to assist in cleaning a food processor is shown therein and designated broadly at 300. The cleaning accessory 300 is generally-disk-shaped and includes a circular main panel 302 with a peripheral lip 304. A ring 306 depends from the main panel 302 adjacent the lip 304. A plurality of discontinuous fins 308 also depend from the main panel 302. Four discontinuous radial slots 310 define a circle A around a tower 316 in the center of the main panel 302, and six discontinuous radial slots 312 define a circle B that is radially inward of circle A. The tower 316 also includes a central hole 318.

Figure 17:
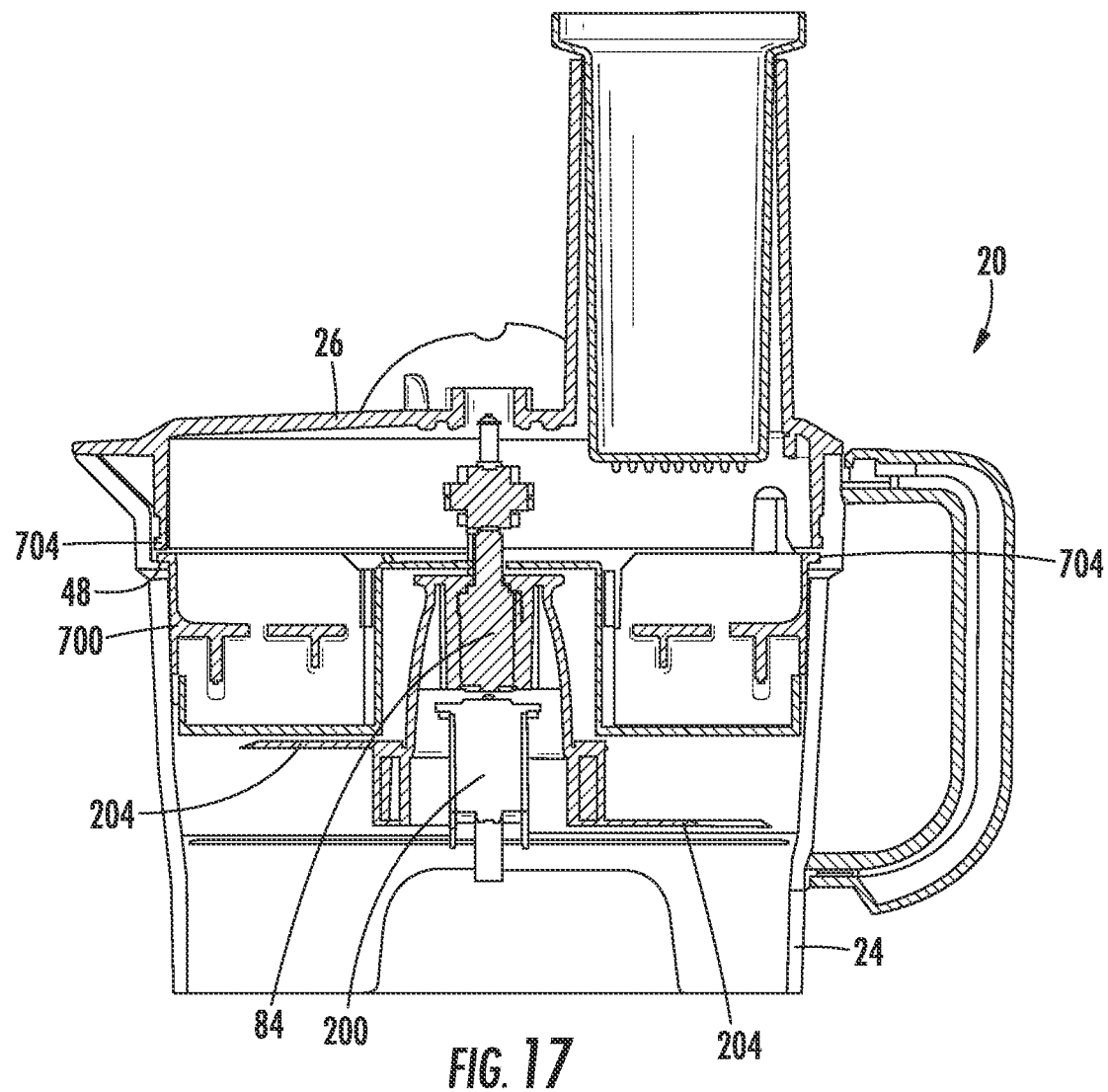
FIG. 17 is a section view of the cleaning accessory of FIG. 15 mounted in the bowl of the food processor of FIG. 1.
Figure 18:
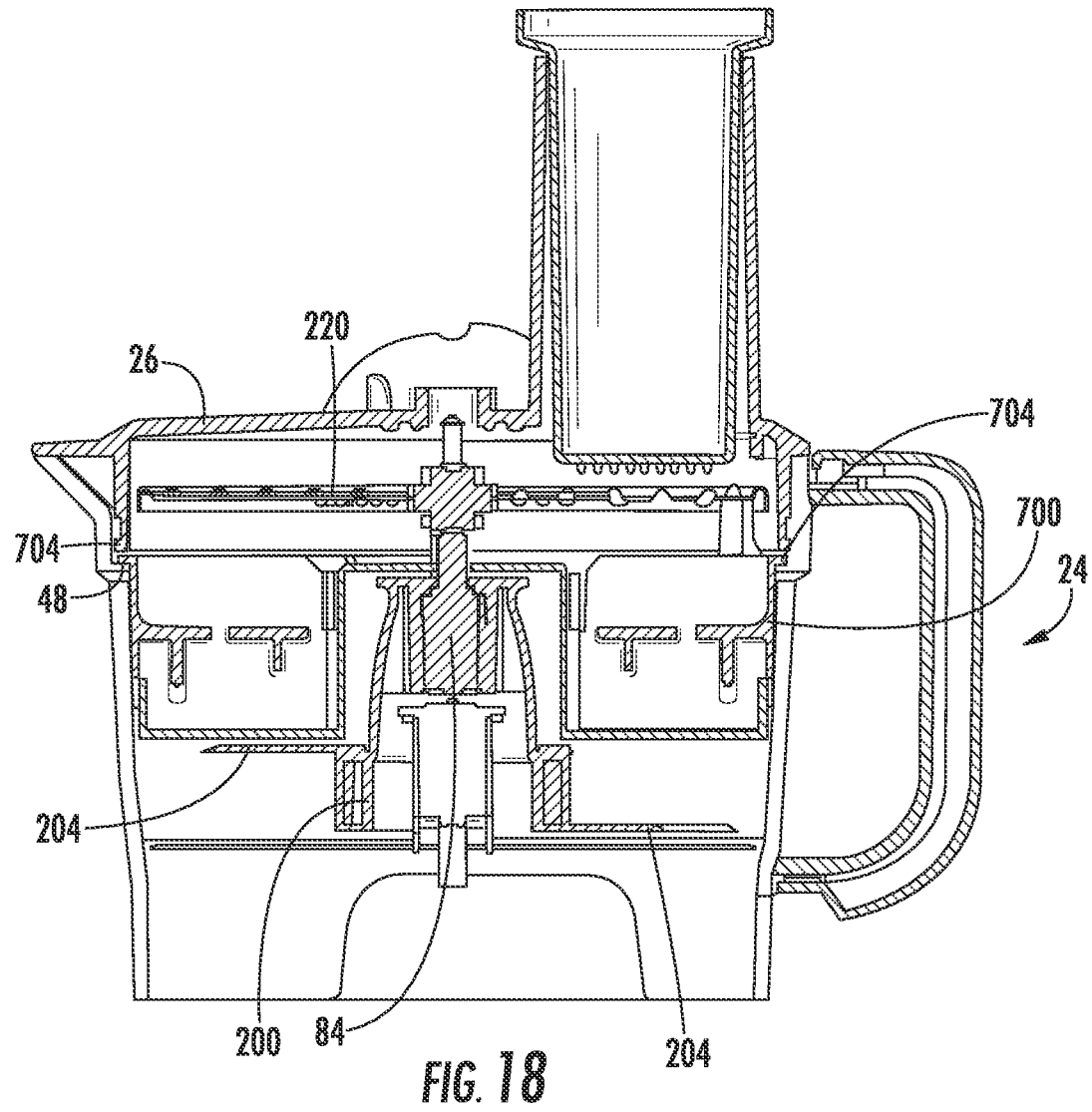
FIG. 18 is a section view of the cleaning accessory of FIG. 15 mounted in the bowl of the food processor of FIG. 1 with a specialty disk (such as the shredding disk of FIG. 7) mounted on the drive shaft of the food processor.

The cleaning accessory 300 is placed within the bowl 24 such that the lip 304 rests on the ridge 48 of the bowl wall and is slidable relative to the bowl 24, with the drive shaft 84 extending through, but not engaging, the central hole 318. (This relationship is shown in FIGS. 17 and 18 in connection with cleaning accessory 700, which is discussed below). Thus, the cleaning accessory 300 is free to rotate relative to the bowl 24 about the drive shaft 84 (by sliding on the ridge 48), but is not driven by the drive shaft 84. The bowl 24 can then be filled with water or another cleaning fluid (typically soap or detergent is added to any cleaning water to assist in breaking down oils that may be present in certain foods), the lid 26 is seated on the bowl 24, and the food processor 10 is operated. Rotation of the drive shaft 84 rotates the S-blade 200. Rotation of the S-blade 200 agitates the liquid in the bowl 24.

Figure 11:
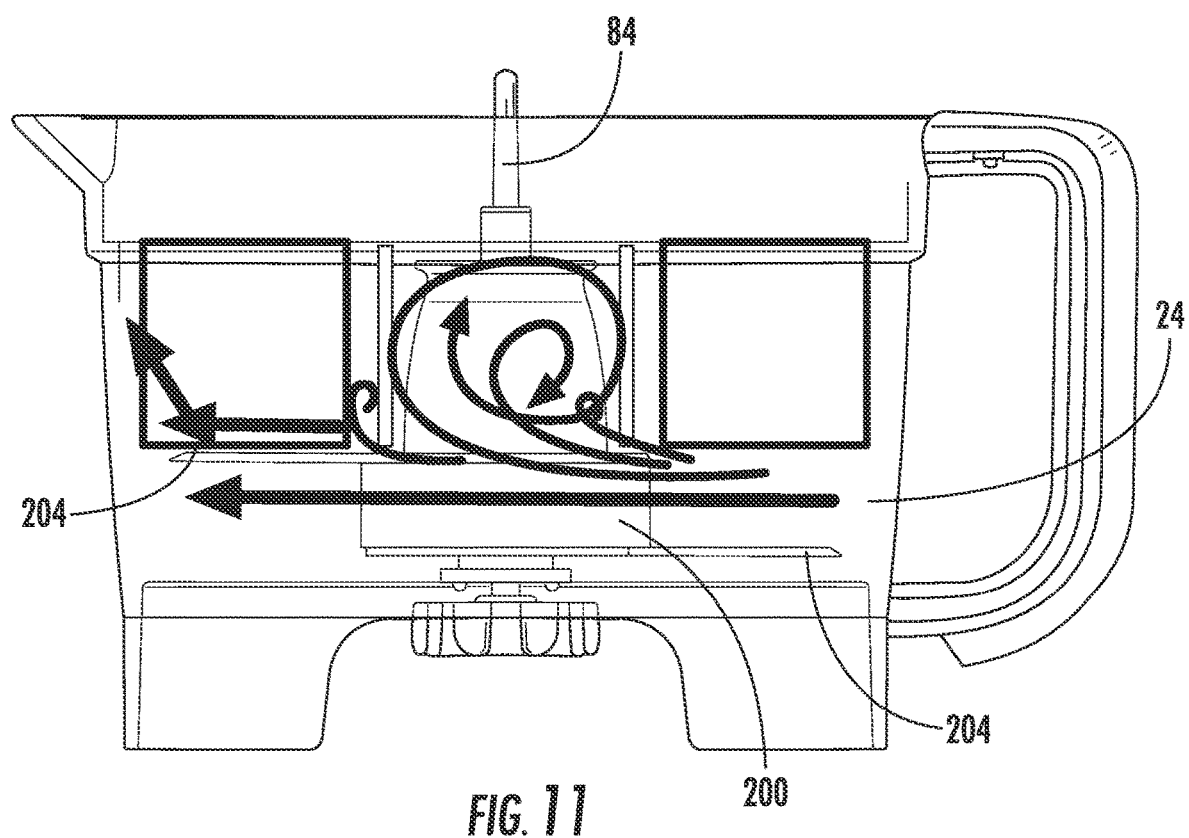
FIG. 11 is a front section view as in FIG. 8 showing the action of liquid in the bowl in response to rotation of the S-blade and with a cleaning accessory positioned therein.

Although the inventor does not wish to be bound by any specific theory of operation, it is believed that the cleaning accessory 300 interrupts the flow against the walls of the bowl 24, as the fins 308 create turbulence in the bowl 24. When fluid comes in contact with the fins 308, eddies are generated. These eddies by nature immediately decay into smaller eddies and create a turbulent cascade (represented as curved arrows and lines in FIG. 11). The S-blade 200 adds energy into the water pushing it into the wall of the bowl 24; the energized water is interrupted and is violently thrown around the bowl 24 and back to the S-blade 200 to repeat the process. This turbulent water imparts a scrubbing action to structures that it contacts. This includes the walls of the bowl 24 and the S-blade 200.

Once cleaned as described above, the S-blade 200, scrubbed by the liquid in the bowl 24, is now clean enough to simply remove and allowed to air-dry. The user does not have to further clean (or even handle) the blades 204 of the S-blade 200 at any point. (The process can simply be repeated if necessary).

Figure 12:
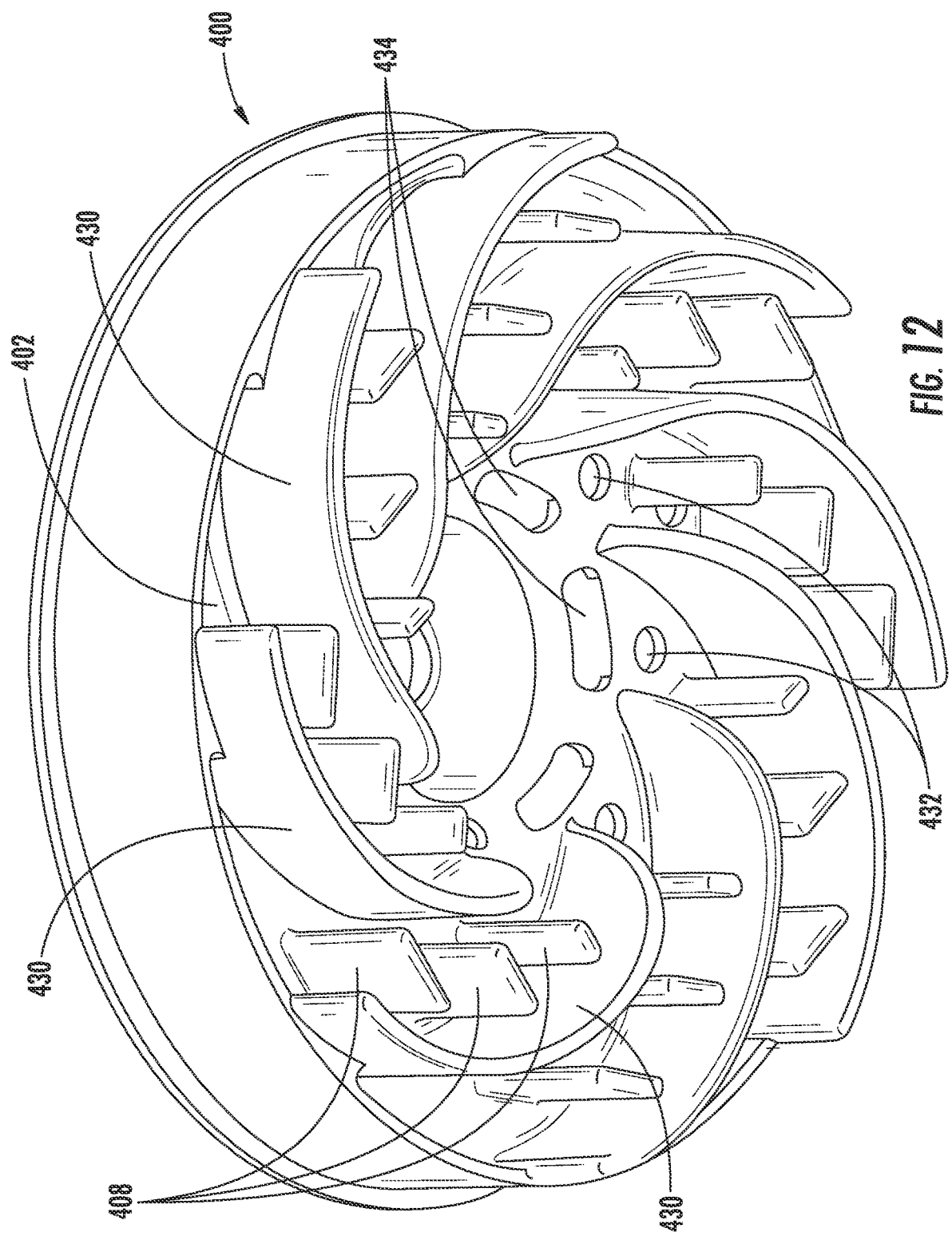
FIG. 12 is a bottom perspective view of a cleaning accessory according to another embodiment of the invention.

Other embodiments of cleaning accessories are also contemplated. For example, FIG. 12 illustrates a cleaning accessory 400 that includes a main panel 402 with radially-extending rays 430 on the underside of the main panel 402. The rays 430 are arranged in a multi-arm spiral pattern (i.e., in a "pinwheel" pattern), with a set of three fins 408 present between each adjacent pair of rays 430. Holes 432 and slots 434 are also present in the main panel 402. In some embodiments, the spiral defined by the rays 430 follows a first rotative direction (e.g., the rays 430 curve in a counterclockwise direction as they extend radially outwardly), and the driveshaft 84 rotates in a second, opposite rotative direction (e.g., clockwise).

In operation, the rays 430 of the cleaning accessory 400 cause the cleaning accessory 400 to rotate when the S-blade 200 is rotating, but at an angular velocity that is typically less than that of the S-blade 200. Because the cleaning accessory 400 is not attached to the drive shaft 84, but instead is configured to slide relative to the ridge 48 of the bowl 24 on which it rests, the cleaning accessory 400 is free to spin at a lesser angular velocity, driven by the action of the liquid. Spinning of the cleaning accessory 400 enables the blades of the S-blade 200 to continuously push a wall of liquid while spinning, which can help to "scrub" the wall of the bowl 24. Also, the presence of the holes 432 can enable the liquid to easily travel above the cleaning accessory 400 in order to clean the lid 26.

Figure 13:
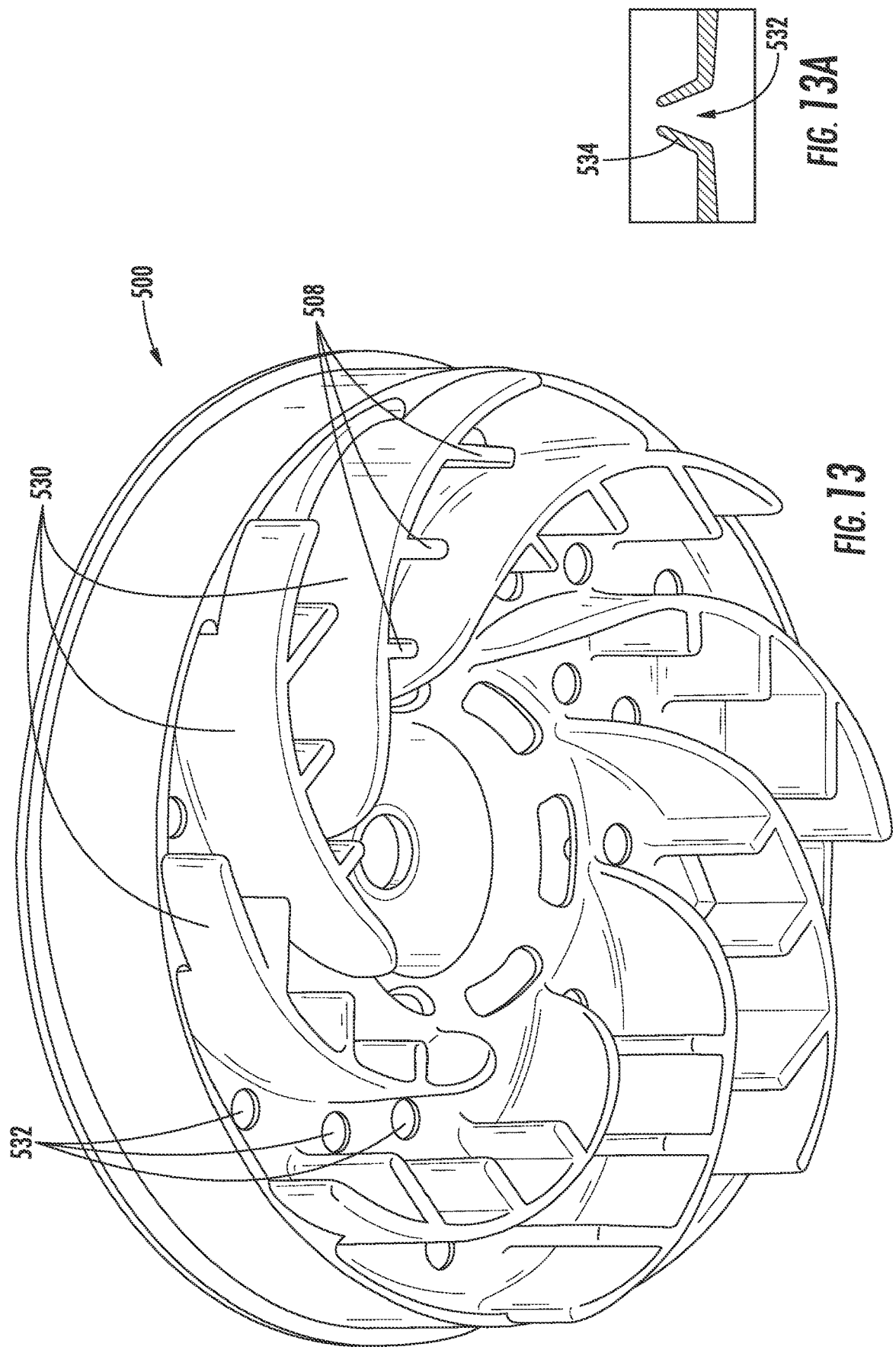
FIG. 13 is a bottom perspective view of a cleaning accessory according to additional embodiments of the invention.

Referring now to FIG. 13, another cleaning accessory, designated broadly at 500, is shown therein. The cleaning accessory 500 is similar to the cleaning accessory 400, but is configured such that the rays 530 are connected with the fins 508 for added strength and integrity. Also, each of the holes 532 leads to a conical nozzle 534 on the upper surface of the main panel 502 (see FIG. 13A). When the cleaning process is initiated, the liquid travels through the holes 532 and nozzles 534 and sprays the underside of the lid 26. (Typically such spraying subsides after the start-up, as the liquid is sufficiently turbulent that it does not travel through the nozzles 534).

Figure 14:
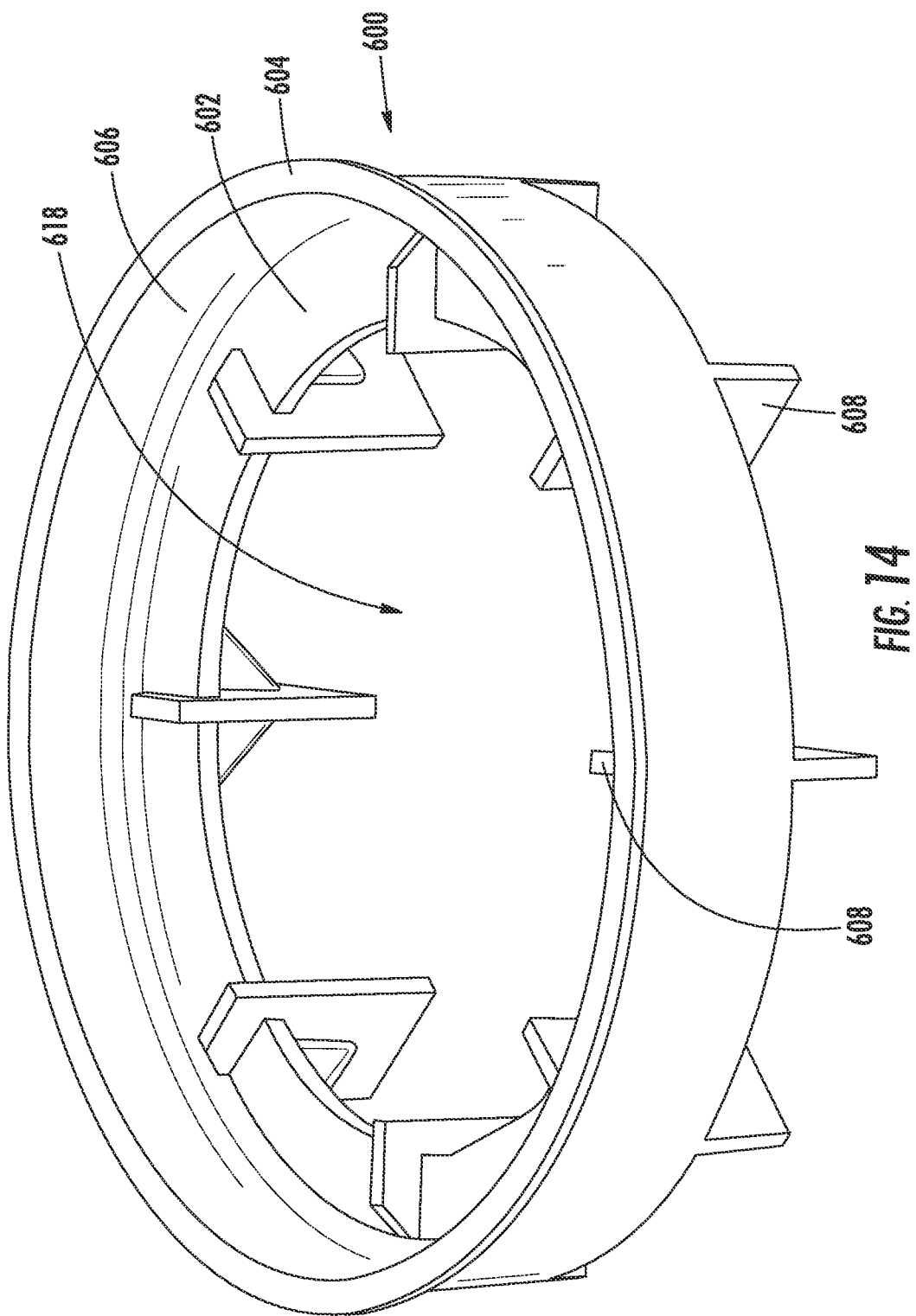
FIG. 14 is a top a perspective view of a cleaning accessory according to further embodiments of the invention.

Referring now to FIG. 14, a further cleaning accessory, designated broadly at 600, is shown therein. The cleaning accessory 600 takes the shape of an open ring, in that it includes a main panel 602 with a very large central hole 618. A ring 606 circumscribes the main panel 602. A radial lip 604 extends radially outwardly from the upper edge of the ring 606. Radially-extending fins 608 are present above and below the main panel 602 and extending radially inwardly therefrom. The lip 604 of the cleaning accessory 600 rests on the 48 of the bowl 24. Operation of the cleaning accessory 600 proceeds as described above in connection with the cleaning accessories 300, 400, 500.

Figure 15:
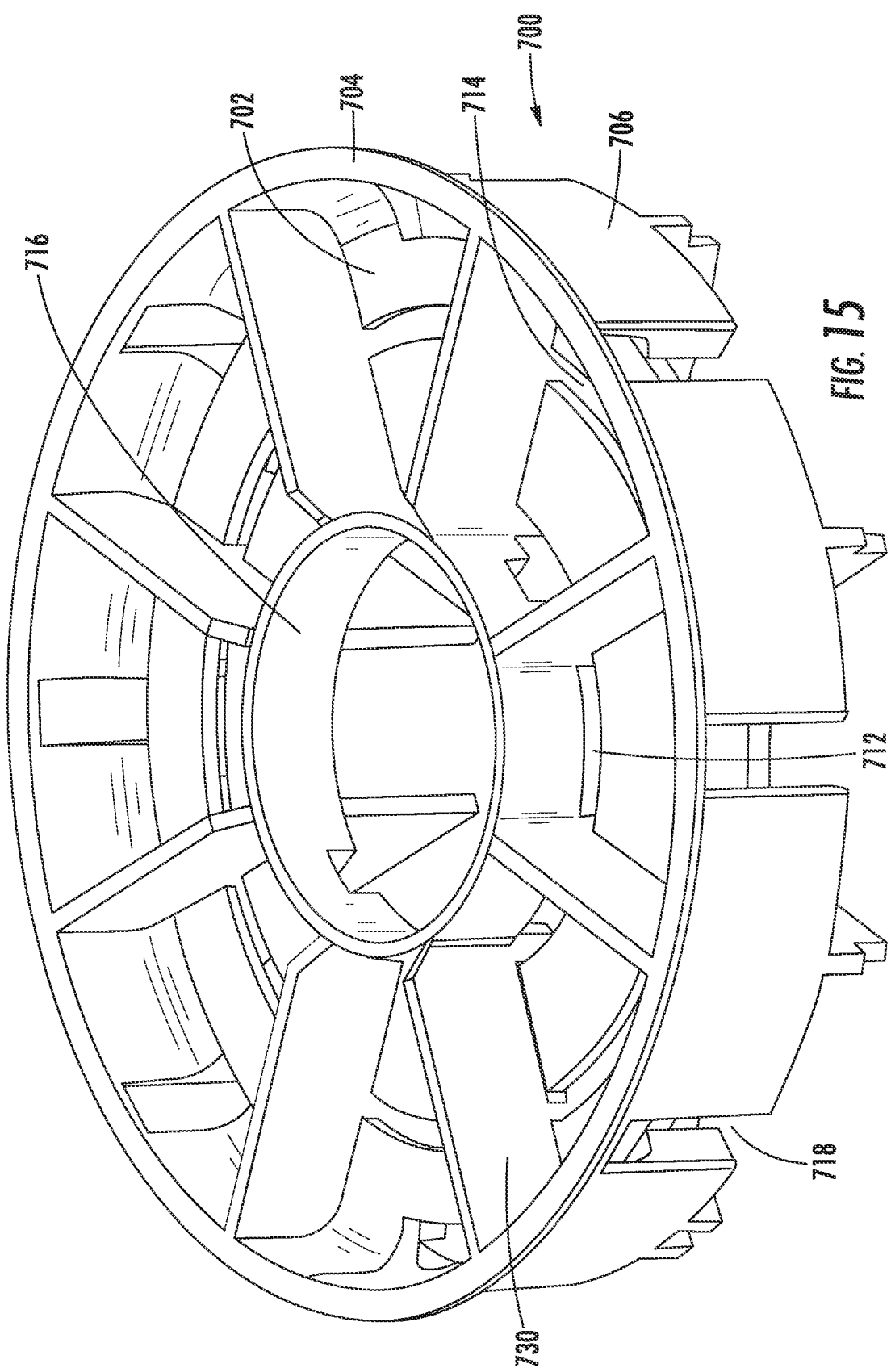
FIG. 15 is a top perspective view of a cleaning accessory according to still further embodiments of the invention.
Figure 16:
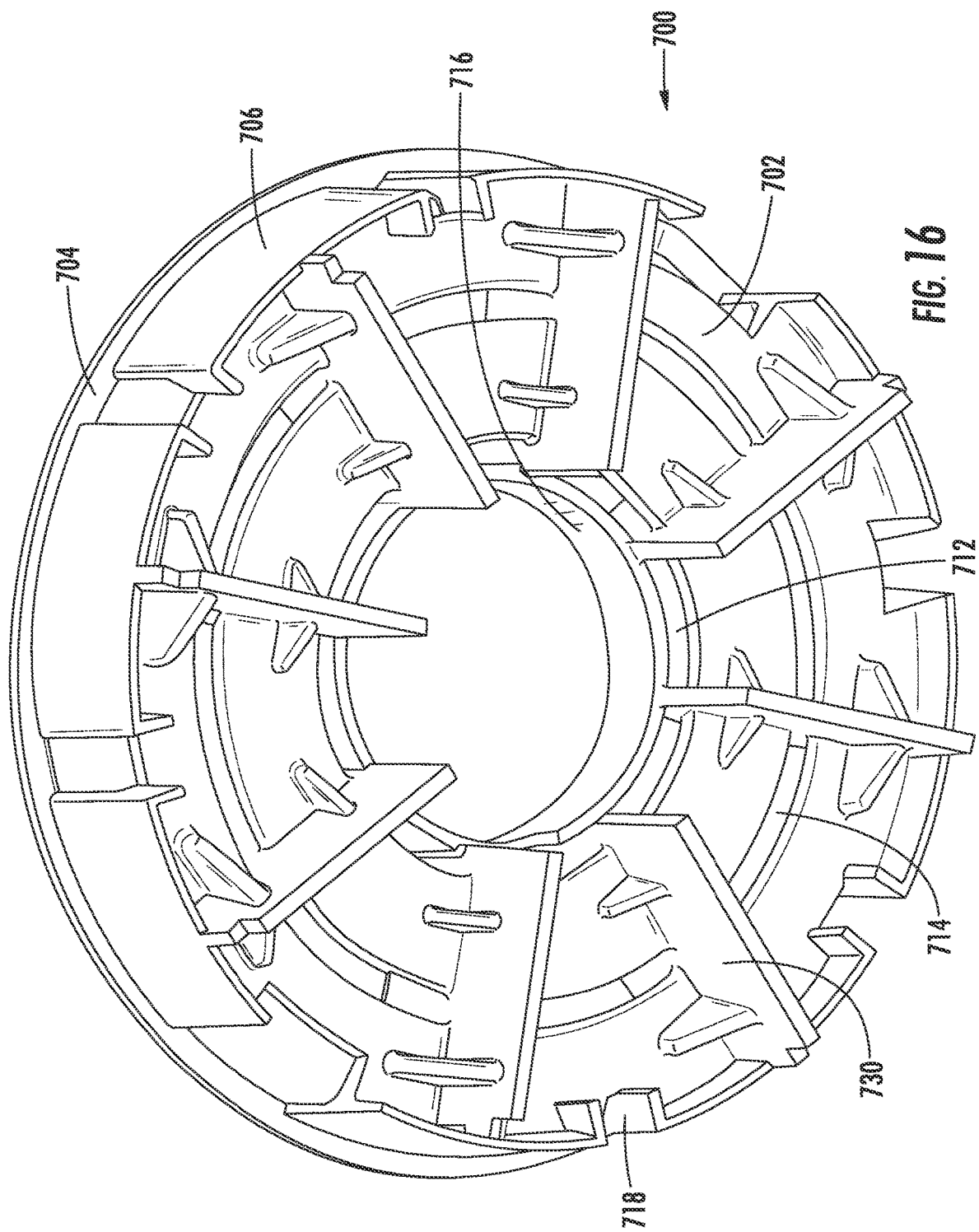
FIG. 16 is a bottom perspective view of the cleaning accessory of FIG. 15.

Referring now to FIGS. 15 and 16, another embodiment of a cleaning accessory, designated broadly at 700, is shown therein. The cleaning accessory 700 includes a main panel 702 that meets a peripheral ring 706; a lip 704 extends radially outwardly from the upper edge of the ring 706. Also, a circular slot 712 is present between the inner edge of the main panel 702 and the hub 716, and another circular slot 714 is present in the main panel 702 that divides the main panel 702 into inner and outer rings.

The cleaning accessory 700 also has rays 730 that extend radially from a central hub 716 and extend both above and below the main panel 702. Above the main panel 702, the rays 730 are similar in height to the ring 706, and below the main panel 702 the rays 730 extend past the lower edge of the ring 706. The extended height of the rays 730 may encourage more vigorous flow of liquid toward the lid 26 of the food processor 20, thus enhancing cleaning action.

In addition, the ring 706 includes vertical slots 718. These vertical slots 718 may also encourage flow of liquid toward the lid 26 of the food processor 20.

FIG. 17 illustrates the cleaning accessory 700 in position within the bowl 24. As can be seen in FIG. 17, the lip 704 of the cleaning accessory 700 rests on the ridge 48 of the bowl 24 and is able to slide relative thereto. Thus, as the S-blade 200 rotates, the cleaning accessory 700 is free to rotate relative to the bowl 24 also, driven by the action of the cleaning fluid as the rotating S-blade 200 imparts energy to the cleaning fluid.

Figure 7:
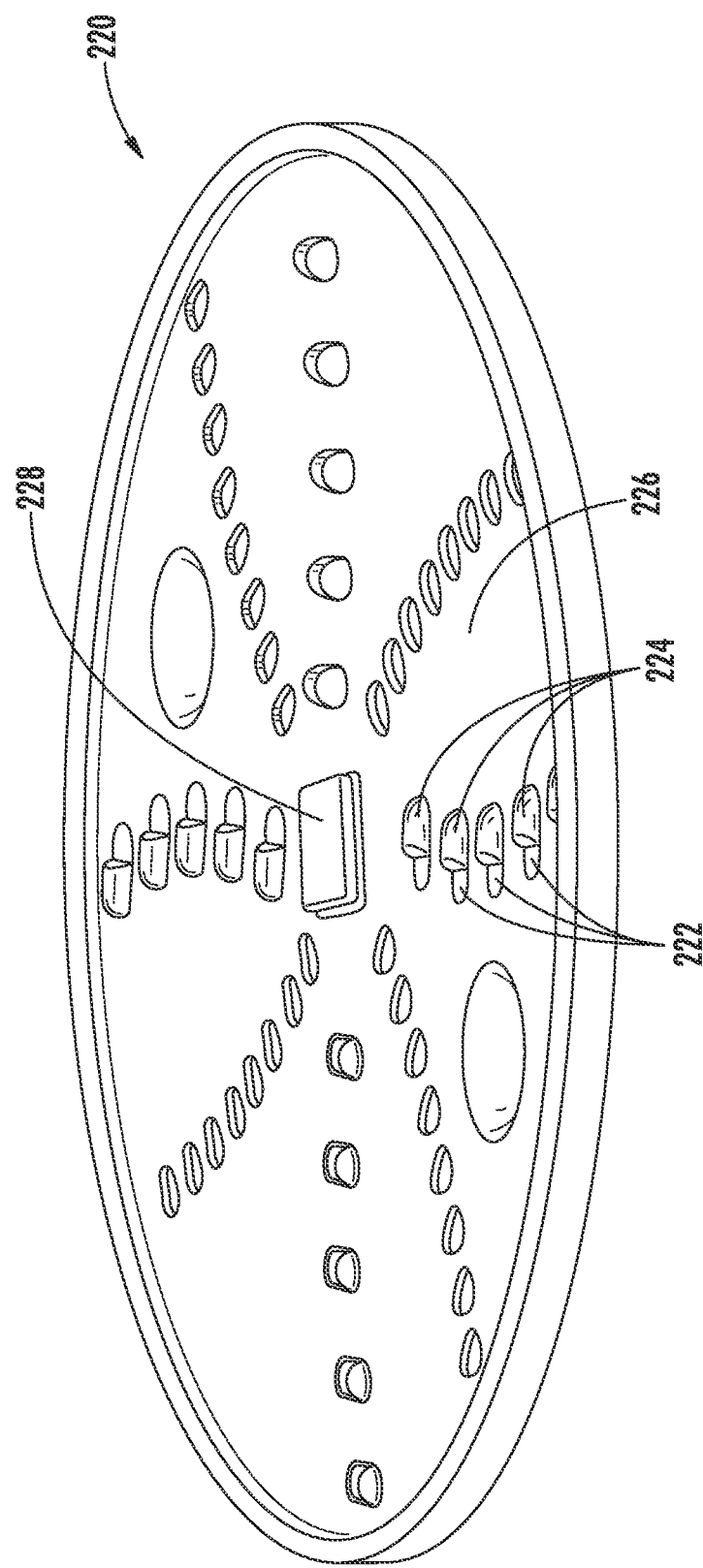
FIG. 7 is a perspective view of a shredding disk for the food processor of FIG. 1.

Those skilled in this art will appreciate that, in addition to the cleaning of the bowl 24, lid 26 and S-blade 200 as described above, the cleaning accessories 300, 400, 500, 600, 700 may also be employed to clean specialty food processing disks employed with the food processor. For example, FIG. 7 illustrates a shredding disk 220. The shredding disk 220 has shredding holes 222 with sharpened half edges 224 on a main panel 226 that is of sufficient diameter that it spans most, if not all, of the space encircled by the rim 60 of the lid 26. A fitting 228 is located in the center of the main panel 226 that is configured to mesh with the drive shaft 84. Once in place, the shredding disk 220 resides at a height somewhat above that of the ridge 48 of the bowl 24. Thus, rotation of the drive shaft 84 rotates the shredding disk 220. Alternative specialty food processing disks (which are attached and operate in a similar manner to the shredding disk 220) include slicing, grating, and spiralizing disks.

Any of these specialty disks can be placed in its normal operation position on the drive shaft 84, with the cleaning accessory 300, 400, 500, 600, 700 resting on the ridge 48 of the bowl 24 so that it is positioned between the S-blade 200 and the specialty food processing disk. This configuration is shown in exemplary fashion in FIG. 18, wherein a specialty food processing disk 220 is positioned above the cleaning accessory 700 and mounted to the drive shaft 84. Cleaning proceeds in the same manner as described above: the food processor 20 is activated, the S-blade 200 rotates (as does the specialty food processing disk), and the cleaning accessory 300, 400, 500, 600, 700 may rotate due to the action of the liquid, but is not driven by the drive shaft 84. The cleaning accessories may be particularly suitable for removing sticky or viscous foodstuffs, such as cheese, from the specialty food processing disks.

Those of skill in this art will appreciate that other alternative embodiments may be employed. For example, although in the illustrated embodiments the cleaning accessories 300, 400, 500, 600, 700 are illustrated as being unengaged and thus decoupled from the drive shaft 84 as the drive shaft 84 extends through their respective central holes, and are therefore free to rotate independently of the drive shaft 84 (by sliding relative to the ridge 48 driven by the action of the liquid), in some embodiments the cleaning accessories may be attached to the drive shaft 84 and rotate therewith, either at the same angular velocity as the drive shaft 84 or at a reduced angular velocity (e.g., via a gear reduction arrangement, a slipping clutch, or the like).

Additionally, the fins, rays, nozzles and other projections and the holes, slots and other apertures shown and discussed above in connection with the various cleaning accessories 300, 400, 500, 600, 700 may be included, omitted, or substituted between the various embodiments. Also, these components may take different forms (e.g., the number, size, shape or contour may vary). In some embodiments, the fins, rays and/or other projections of the cleaning accessories may extend downwardly from the main panel to a distance of between about 1 mm and 25 mm of the S-blade. In other embodiments, the fins, rays and other projections may extend downwardly from the main panel between about 0.5 and 2 inches, and/or the fins and other projections may extend between 0.25 and 1.5 inches upwardly from the main panel.

Further, the cleaning accessories may have configurations that are not substantially disk-shaped. For example, rather than a flat main panel, a cleaning accessory may have a main body that is arcuate; i.e., the main body may be concave or convex relative to the floor of the bowl. As another example, the main body of the cleaning accessory may be conical or frustoconical. As a further example, the main body of the cleaning accessory may have a multi-stepped or undulating cross-section. In still further embodiments, the projections (e.g., the rays and fins) may be "double-walled" with a gap between the walls. Other variations may also be suitable.

Figure 19:
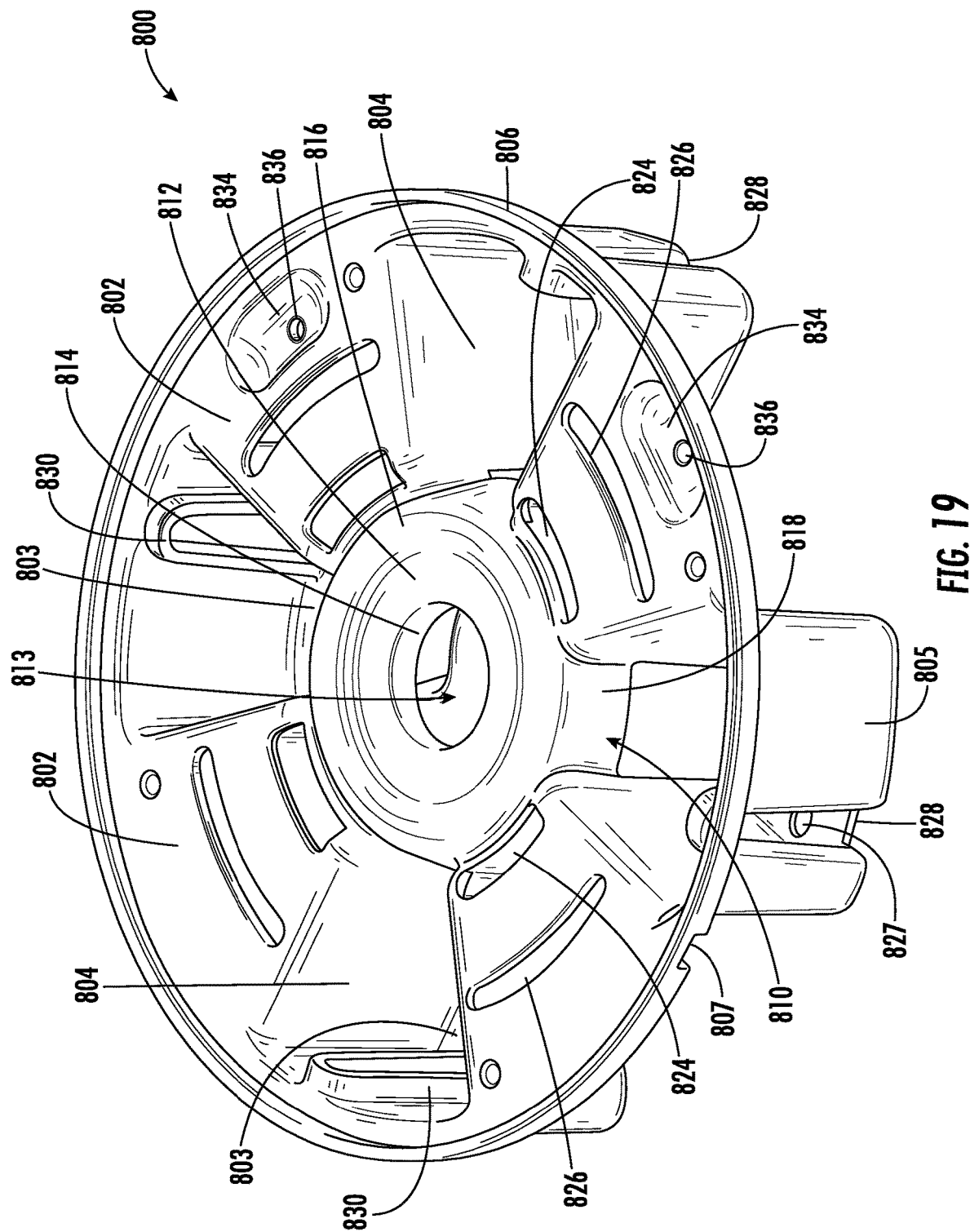
FIG. 19 is a top perspective view of a cleaning accessory according to further embodiments of the invention.
Figure 20:
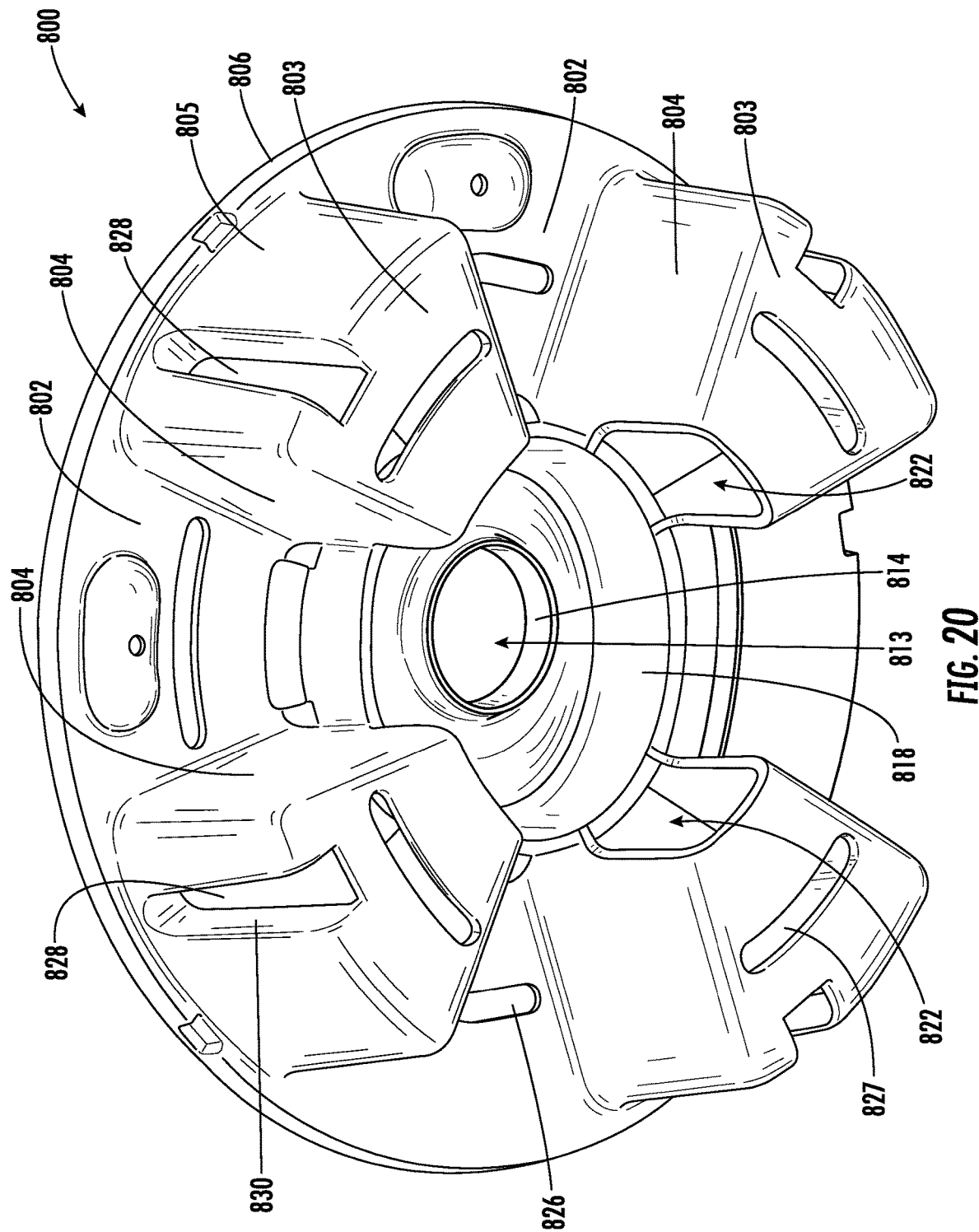
FIG. 20 is a bottom perspective view of the cleaning accessory of FIG. 19.

An example of a cleaning accessory having a multi-stepped cross-section is shown in FIGS. 19 and 20 and is designated broadly at 800. The cleaning accessory 800 includes four upper panels 802 and four lower panels 803 that are circumferentially interposed between each other. A vertical dividing wall 804 extends between each adjacent pair of upper and lower panels 802, 803. A vertical outer wall 805 is located at the radially-outward edge of each of the lower panels 803. A rim 806 encircles the upper panels 802 and the upper edges of the outer walls 805. Notches 807 are present in the lower edge of the rim 806.

A hub 810 is located radially inwardly of and merges with the inner edges of the upper panels 802. The hub 810 includes a central ring 812 with a downwardly-extending lip 814 that encircles a hole 813, an intermediate ring 816 having an arcuate cross-section, and a vertical outer ring 818 that extends downwardly from the intermediate ring 816. The outer ring 818 does not extend to the lower panels 803 (and, in some embodiments extends less than half the distance between the upper and lower panels 802, 803), such that inner openings 822 are formed by the lower edge of the outer ring 818, two adjacent dividing walls 804, and a respective lower panel 803.

Additional openings are also present in the cleaning accessory 800. An inner slot 824 is located near the inner edge of each of the upper panels 802. An intermediate slot 826 is located near the center of each of the upper panels 802; a corresponding intermediate slot 827 is located similarly near the center of each of the lower panels 803. A vertical slot 828 is positioned in each of the outer walls 805, and is lined on three sides by a channel 830 that extends radially inwardly. In the illustrated embodiment, the vertical slots 828 are not centered in the vertical wall 805, but instead are circumferentially offset from center by 5-15 degrees. Also, two of the upper panels 802 each include a soap recess 834 with a hole 836.

The cleaning accessory 800 can be used in much the same manner described above for the cleaning accessories 300, 400, 500, 600, 700; i.e., the cleaning accessory 800 is placed within the bowl 24 such that the rim 806 rests on the ridge 48 of the bowl wall, with the drive shaft 84 extending through, but not engaging, the central hole 813. The notches 807 receive ridges in the rim of the bowl 24, with the result that the cleaning accessory 800 does not rotate relative to the bowl 24. The bowl 24 can then be filled with water or another cleaning fluid, the lid 26 is seated on the bowl 24, and the food processor 10 is operated. Rotation of the drive shaft 84 rotates the S-blade 200. Rotation of the S-blade 200 agitates the liquid in the bowl 24 and cleans the bowl 24 and the S-blade 200.

It should be noted that the soap recesses 834 may be filled with dishwashing soap or another concentrated cleaning agent prior to the cleaning process. The soap recesses 834 can provide a convenient location for the user to deposit dishwashing soap or another cleaning enhancer. The holes 836 in the soap recesses 834 can enable soap deposited therein to flow freely to locations beneath the cleaning accessory 800 as well as above it.

Also, the offset positions of the vertical slots 828 can provide different flow characteristics to the cleaning fluid during cleaning. Typically, the S-blade 200 is rotated in both directions (i.e., clockwise and counterclockwise) during cleaning. By positioning the vertical slots 828 in a circumferentially offset location, water flowing through the slots 828 may have different flow paths, and therefore different cleaning actions, based on the rotational direction of the S-blade 200. In addition, the presence of the channel 830 around each slot 828 can provide a "nozzle" effect to water passing through the slot 828, which can further enhance cleaning action.

The presence of upper and lower panels 802, 803 may also enhance the strength, rigidity and/or durability of the cleaning accessory by avoiding an "cantilevered" structures like some of the rays and fins discussed above.

In addition, it is contemplated that the cleaning accessory 800 may be employed during food processing operations. When in position on the rim of the bowl 24, the accessory 800 effectively reduces the volume of the bowl available for food processing by providing a lower "ceiling" for the food processing chamber than does the lid 26. As such, the food being processed is maintained in closer proximity to the blades so that food is processed more efficiently and/or effectively.

The cleaning accessory may be formed of any number of materials, but in some embodiments may be formed of a polymeric material such as acrylonitrile-butadiene-styrene (ABS), nylon (often glass-filled), or the like. It may be desirable in some embodiments for the cleaning accessory to be formed of a material with sufficient heat resistance that it can cleaned in a dishwasher after use.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cleaning accessory for a food processor, comprising:
   a central hub having a central hole;
   a plurality of upper panels extending radially outwardly from the central hub;
   a plurality of lower panels being positioned to circumferentially alternate with the plurality of upper panels;
   a plurality of dividing walls, each of the dividing walls extending between an upper panel and an adjacent lower panel; and
   an outer rim encircling the plurality of upper panels.

2. The cleaning accessory defined in claim 1, wherein each of the plurality of upper panels includes a first opening.

3. The cleaning accessory defined in claim 2, wherein each of the plurality of lower panels includes a second opening.

4. The cleaning accessory defined in claim 3, wherein the first openings and the second openings are slots, and wherein the first openings are located at substantially the same radial distance from the central hole as the second openings.

5. The cleaning accessory defined in claim 4, wherein each of the upper panels includes a third opening that is positioned radially inward of the first opening.

6. The cleaning accessory defined in claim 1, further comprising a plurality of vertical walls, wherein a respective one of the vertical walls extends between an outer edge of each lower panel and the rim.

7. The cleaning accessory defined in claim 6, further comprising a vertical slot in each of the vertical walls.

8. The cleaning accessory defined in claim 7, wherein the vertical slot is circumferentially offset between adjacent dividing walls.

9. The cleaning accessory defined in claim 7, wherein a channel lines at least some of the periphery of the vertical slot.

10. The cleaning accessory defined in claim 1, wherein a plurality of fourth openings are present, wherein each fourth opening is defined by two dividing walls, the central hub, and a lower panel.

11. The cleaning accessory defined in claim 1, wherein at least one of the upper panels includes a soap recess.

12. The cleaning accessory defined in claim 1, formed of a polymeric material.

13. A cleaning accessory for a food processor, comprising:
a central hub having a central hole;
a plurality of upper panels extending radially outwardly from the central hub;
a plurality of lower panels being positioned to circumferentially alternate with the plurality of upper panels;
a plurality of dividing walls, each of the dividing walls extending between an upper panel and an adjacent lower panel;
an outer rim encircling the plurality of upper panels; and
a plurality of vertical walls, wherein a respective one of the vertical walls extends between an outer edge of each lower panel and the rim;
wherein a plurality of inner openings are present, and wherein each inner opening is defined by two dividing walls, the central hub, and one of the plurality of lower panels.

14. The cleaning accessory defined in claim 13, wherein a channel lines at least some of the periphery of a vertical slot.

15. The cleaning accessory defined in claim 13, wherein a vertical slot is circumferentially offset between adjacent dividing walls.

16. The cleaning accessory defined in claim 13, wherein at least one of the upper panels includes a soap recess.

17. The cleaning accessory defined in claim 13, formed of a polymeric material.

18. The cleaning accessory defined in claim 13, wherein each of the plurality of upper panels includes a first opening, and each of the plurality of lower panels includes a second opening.

19. The cleaning accessory defined in claim 18, wherein the first openings and the second openings are slots, and wherein the first openings are located at substantially the same radial distance from the central hole as the second openings.

* * * * *